July 29, 1952 H. P. KALMUS ET AL 2,605,428

DEVICE FOR THE AMPLIFICATION OF MINUTE SPACE CURRENTS

Filed April 22, 1948

INVENTORS

Henry P. Kalmus and

BY George O. Stritz

Michael J. ...

Patented July 29, 1952 2,605,428

UNITED STATES PATENT OFFICE 2,605,428

DEVICE FOR THE AMPLIFICATION OF MINUTE SPACE CURRENTS

Henry P. Kalmus and George O. Striker, Chicago, Ill.

Application April 22, 1948, Serial No. 22,648

10 Claims. (Cl. 250—83.3)

The amplification of small electronic or ionic space current which hold their value for intervals longer than about one second, presents the designer with serious problems of drift, stability, linearity and complexity of design. Such currents, as a rule, have been amplified for the purpose of measurement, control, etc., with direct current amplifiers of the "direct-coupled" type, having well known disadvantages of design. In order to eliminate the use of D. C. amplifiers, several methods have been used. Some of these employ mechanical means to convert the minute D. C. signals into alternating currents for more convenient amplifications. Others have introduced an A. C. "sub-carrier" by impressing on one of the amplifier electrodes an A. C. voltage, thereby periodically varying the gain of the system. The former method is disliked for its use of mechanically moving interrupting means, while the latter one presents serious problems of accomplishing exact balance, so that no disturbances be introduced by the "sub-carrier" in the absence of a D. C. space-current to be measured, or amplified.

Our invention presents a solution toward the amplification of minute electronic or ionic space currents, void of the above drawbacks and capable of stable, simple and reproducible amplification of such currents to a degree not heretofore possible.

Figure 1:
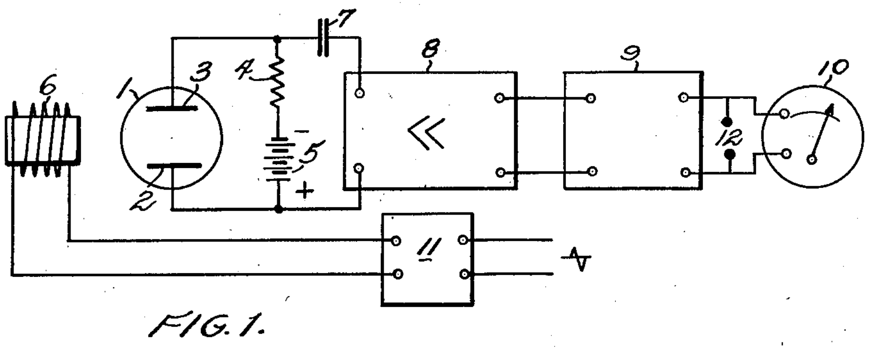

In order to describe the principles of the amplification of minute space currents, we refer to Figure 1. Here 1 represents a vessel *w* which may be partially or entirely evacuated. 2 and 3 are electrodes, a cathode and an anode, respectively, connected into a circuit with resistance 4 and the D. C. voltage source 5. A current may flow in this circuit due to the following reasons: electron-emission from the cathode, ionization of any gas present and conductive leakage between the electrodes. While we often desire to amplify the two space-currents, we are eager to exclude the influence of leakage from our variables.

In order to attain this result to render the minute electronic or ionic space currents easily capable of amplification, we apply a periodically variable magnetic field to the space between the electrodes and so oriented, that it will have at least a component at right angles to the undisturbed flow of electrons or ions in this space. This alternating magnet field, generated by electromagnet 6 in the vicinity of electrodes 2 and 3 will periodically alter the magnitude of the space-current between these electrodes and thus generate an alternating potential across resistor 4 capable of stable amplification. This small A. C. voltage is applied through condenser 7 to the input of amplifier 8. The amplified A. C. voltage is passed through filter network 9 which attenuates all frequencies other than that generated in the input circuit. In this manner we reduce the response of the system to any undesired voltages or currents, such as circuit noise, tube noise, microphonism or external disturbances. It is of course possible to incorporate the filter network either into the amplifier proper or into the indicating means 10 connected to the output of same. 11 indicates a source of A. C. current for the energizing magnet field 6. Such as a line transformer or an A. C. generator. Terminals 12 may be used for deriving an amplified voltage for remote indication or control. Rectifiers of known kind may be used to obtain D. C. currents from the output.

Figure 2:
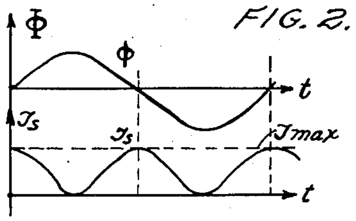

Figure 2 illustrates a way of varying the space-current $I_s$ in the discharge vessel 1. In the upper curve we plotted the sinusoidal variation of the magnetic field generated by the electromagnet 6 versus time. The lower curve indicates the corresponding variation in space-current $I_s$ using the same time-scale. The current reaches a maximum $I_{max}$ whenever the magnetic field goes through zero. $I_{max}$ is that space current which flows in the absence of any magnet field. As the magnet field reaches its positive or negative maximum, however, the space-current $E_s$ is suppressed due to deflection of the electrons or ions from their paths to the anode. These deflected particles are then either returned to the cathode or they strike the walls of the vessel. They do not contribute to the total space current however. Other arrangements, resulting in a different relation between current and magnetic flux will be described below. The principle described above, consisting in the periodic variation of the otherwise constant or slowly changing space current by the use of a magnetic field and the subsequent amplification of the resulting alternating voltage through a sharply tuned amplifier may be applied to the amplification of space currents of varied origin.

We have found that a very great amplification of photelectric currents could be realized by applying the periodically varying magnetic field to a photo-multiplier tube of conventional construction. In such an embodiment of our invention the varying magnet field can be made to traverse one or more stages of the multiplier tube with a corresponding variation of conversion-frequency and efficiency.

Figure 3:
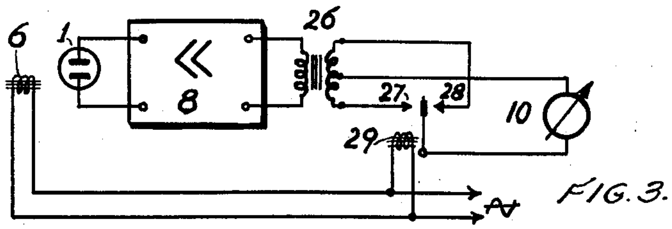

In restricting the frequency response of our device to the desired signal frequency, it is of very great advantage to employ synchronous rectification of the amplified signal currents. Figure 3 shows an embodiment of our invention, in which a vibrator type rectifier is used in synchronism with the alternating magnet field 6 applied to the space discharge device. The output of amplifier 8 is fed through transformer 26 to vibrator contacts 27, 28. The vibrator is actuated by field coil 29 actuated from a common source with coil 6. In this manner the band-width of the overall response is restricted to a few cycles with a corresponding increase in useful signal-to-noise ration and suppression of interfering frequencies.

Figure 4:
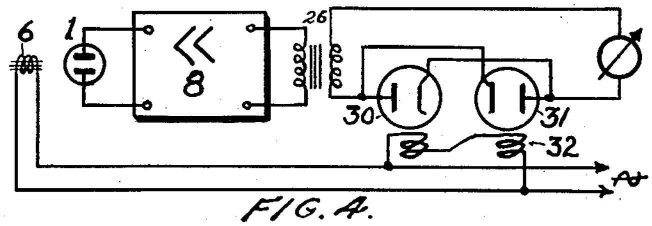

Figure 4 shows a different and novel manner of synchronous rectification which is particularly suitable in connection with our invention. The A. C. signal output of amplifier 8 is fed through transformer 26 into a circuit consisting of two thermionic diodes 30 and 31 and indicating instrument 10. The thermionic diodes are both in the proximity of a field coil 32 energized by the same A. C. voltage which also energizes electromagnet 6 in the input of the amplifier. When the alternating magnetic field generated by coil 32 reaches a predetermined value, it suppresses the thermionic current in both diodes 30 and 31. When, on the other hand, the magnet field is below this predetermined value, both diodes are conductive. It can be seen, that the current passed through both diodes and instrument 10 will pass twice during each magnetizing cycle in exactly the same manner as the space-current passes through the space-discharge vessel 1, as illustrated in Figure 2. Such a system essentially represents a synchronous rectifier of a novel type, in that it is entirely insensitive to alternating voltages of other than twice the magnet field frequency. By adding a constant D. C. bias current to the alternating current in coil 32 the rectification will be synchronized with the fundamental rather than the second harmonic. The great advantage of such a system of rectification is in the complete absence of mechanically moving parts and in the simplicity and efficiency of controlling the proper synchronizing frequency.

Figure 5:
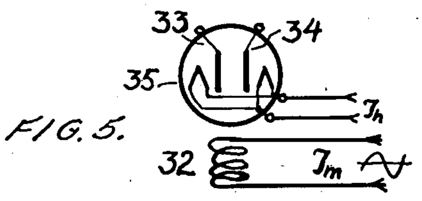

In Figure 5 we disclose a thermionic switching device along the above lines, in which we eliminate separate anode-surfaces and employ only two emissive cathode surfaces 33 and 34 enclosed in a single envelope 35. The space between these two cathodes is under the influence of electromagnet 32 while heaters are provided to keep the cathodes in an emissive condition. If such a device is connected into the output circuit as shown in Figure 6, we accomplish in accordance with our invention, synchronized rectification.

If the signal current $I_s$ has twice the frequency of the magnet field $I_m$, the synchronized thermionic switch 36 will, depending on the relative phase, pass either positive or negative half waves only. Passing through an amplifier having no phase shift at this frequency, these positive or negative half waves will arrive at switching tube 36 at a time when the magnet field is small and electrons will flow undisturbed, causing an average D. C. current in indicator 10. For all other frequencies, the voltages arriving at switching tube 36 during its conductive interval will alternately contain both positive and negative values and no average D. C. component will appear in the circuit containing indicator 10. Since this indicator responds to direct current only, it will not be deflected by such undesired frequencies.

Figure 6:
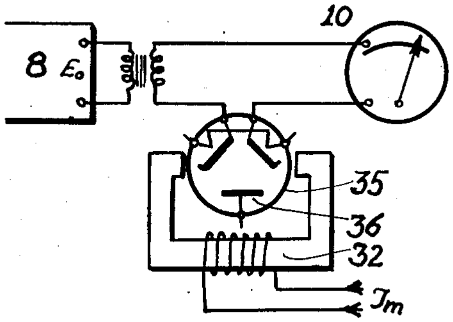

The electrodes 34 and 33 and electromagnet 32 may be arranged as indicated in Figure 6 so that during low values of the magnet field the electrons are able to reach the opposite "anode." When the magnet field reaches a predetermined value, the electrons are bunched or deflected upon "collector" 36, which appropriately connected to remove the deflected electrons from the circuit. Such an arrangement will substantially reduce the magnetic field in coil 32 required for satisfactory operation.

While we have shown and described the particular embodiments of our invention, it will be obvious to those skilled in the art, that changes, modifications and combinations may be made without departing from the broader aspects of our invention and we, therefore, aim in the appended claims to cover all such changes and modifications as fall within the true spirit and scope of our invention.

We claim:

1. In an electronic device, designed for the amplification of minute space currents of a vessel, in combination, at least two electrodes in said vessel spaced from each other, said electrodes being connected to a source of direct current, means for changing at least a portion of the current between said electrodes to alternating current having potentials of a predetermined frequency, said means including a field generator energizable to create an alternating magnetic field in accordance with a frequency proportional to said first mentioned frequency, said generator being interconnected to an electric circuit, an amplifier for alternating current connected with its input side in a second circuit with said electrodes for being fed therefrom said potentials, frequency selection means associated with said amplifier and arranged to be tuned to a frequency proportional to said first named frequency, means connected at least with relation to the output side of said amplifier for receiving amplified alternating current potentials of selected frequency and operable thereby, and means interconnected in said first named circuit and disposed near said receiving means and including a tube in said second circuit and a second field generator in said first-named circuit disposed near said tube and arranged to rectify the current flowing to said receiving means in synchronism with the current of said first-named circuit.

2. In an electronic device, designed for the amplification of minute space currents of a vessel, in combination, at least two electrodes in said vessel spaced from each other, said electrodes being connected to a source of direct current, means for changing at least a portion of the current between said electrode to alternating current having potentials of a predetermined frequency, said means including a field generator energizable to create an alternating magnetic field in accordance with a frequency proportional to said first mentioned frequency, said generator being interconnected to an electric circuit, an amplifier for alternating current connected with its input side in a second circuit with said electrodes for being fed therefrom said potentials, frequency selection means associated with said amplifier and arranged to be tuned to a frequency proportional to said first named frequency, means connected at least with relation to the output side of said amplifier for receiving amplified alternating current potentials of selected frequency and operable thereby, and means interconnected in said first named circuit and disposed near said receiving means and including a thermionic diode in said second circuit, and a second generator in said first named circuit disposed near said diode for generating a magnetic field applied thereto to suppress the electron current flowing therein, in synchronism with said first named magnetic field to rectify synchronously the current received by said receiving means.

3. In an electronic device for the amplification of minute space currents, in combination, a discharge vessel having two electrodes, said elctrodes being connected to a source of direct current; a device for producing an alternating magnetic field in said discharge vessel having a component at right angles to the flow of electrically charged particles between said electrodes; an energizing winding forming part of said device; an amplifier for alternating current having an input side connected to said electrodes; frequency selecting means associated to said amplifier; and phase sensitive output-measuring means synchronized in phase and frequency with the current through said energizing winding.

4. In an electronic device for the amplification of minute space currents, in combination, a discharge vessel having two electrodes, said electrodes being connected to a source of direct current; a device for producing an alternating magnetic field in said discharge vessel having a component at right angles to the flow of electrically charged particles between said electrodes; an energizing winding forming part of said device; means for energizing said winding in a predetermined frequency; an amplifier for alternating current having an input side connected to said electrodes; frequency selecting means associated to said amplifier and adapted to be tuned to a frequency proportional to the predetermined frequency; and a phase sensitive rectifier synchronized in phase and frequency with the current through said energizing winding.

5. In an electronic device for the amplification of minute space currents, in combination, a discharge vessel having two electrodes, said electrodes being connected to a source of direct current; a device for producing an alternating magnetic field in said discharge vessel having a component at right angles to the flow of electrically charged particles between said electrodes; an energizing winding forming part of said device; means for energizing said winding in a predetermined frequency; an amplifier for alternating current having an input side connected to said electrodes; frequency selecting means associated to said amplifier and adapted to be tuned to a frequency proportional to the predetermined frequency; a mechanical rectifier having two stationary contacts connected, respectively, to the output terminals of said amplifier; a vibrating contact forming part of said rectifier; and a second winding for actuating said vibrating contact and connected in shunt to said energizing winding.

6. In an electronic device for the amplification of minute space currents, in combination, a discharge vessel having two electrodes, said electrodes being connected to a source of direct current; a device for producing an alternating magnetic field in said discharge vessel having a component at right angles to the flow of electrically charged particles between said electrodes; an energizing winding forming part of said device; means for energizing said winding in a predetermined frequency; an amplifier for alternating current having an input side connected to said electrodes; frequency selecting means associated to said amplifier and adapted to be tuned to a frequency proportional to the predetermined frequency; and a rectifier tube connected to the output side of said amplifier and adapted to supply to said energizing winding rectified impulses having the frequency of said frequency selecting means.

7. In an electronic device for the amplification of minute space currents, in combination, a discharge vessel having two electrodes, said electrodes being connected to a source of direct current; a device for producing an alternating magnetic field in said discharge vessel having a component at right angles to the flow of electrically charged particles between said electrodes; an energizing winding forming part of said device; means for energizing said winding in a predetermined frequency; an amplifier for alternating current having an input side connected to said electrodes; frequency selecting means associated to said amplifier and adapted to be tuned to a frequency proportional to the predetermined frequency; a diode having electrodes connected, respectively, to the output terminals of said amplifier; and a second winding arranged for creating a magnetic field substantially at right angles to the flow of electrically charged particles between said electrodes of said diode, said winding being connected in shunt to said energizing winding.

8. In an electronic device for the amplification of minute space currents, in combination, a discharge vessel having two electrodes, said electrodes being connected to a source of direct current; a device for producing an alternating magnetic field in said discharge vessel having a component at right angles to the flow of electrically charged particles between said electrodes; an energizing winding forming part of said device; means for energizing said winding in a predetermined frequency; an amplifier for alternating current having an input side connected to said electrodes; frequency selecting means associated to said amplifier and adapted to be tuned to a frequency proportional to the predetermined frequency; two diodes connected in parallel and opposition to the output of said amplifier; and two windings arranged, respectively, for creating magnetic fields, respectively, substantially at right angles to the flow of electrically charged particles in said diodes, said windings being connected in series, the series connection of said windings being connected in shunt to said energizing winding.

9. In an electronic device for the amplification of minute space currents, in combination, a discharge vessel having two electrodes, said electrodes being connected to a source of direct current; a device for producing an alternating magnetic field in said discharge vessel having a component at right angles to the flow of electrically charged particles between said electrodes; an energizing winding forming part of said device; means for energizing said winding in a predetermined frequency; an amplifier for alternating current having an input side connected to said electrodes; frequency selecting means associated to said amplifier and adapted to be tuned to a frequency proportional to the predetermined frequency; a double diode having two pairs of electrodes connected, respectively, to the output terminals of said amplifier; and a second winding arranged for creating a magnetic field substantially at right angles to the flow of electrically charged particles between said pairs of electrodes of said double diode, said winding being connected in shunt to said energizing winding.

10. In an electronic device, designed for the amplification of minute space currents of a vessel, in combination, at least two electrodes in said vessel spaced from each other, said electrodes being connected to a source of direct current, means for changing at least a portion of the current between said electrodes to alternating current having potentials of a predetermined frequency, said means including a field generator energizable to create an alternating magnetic field in accordance with a frequency proportional to said first-mentioned frequency, said generator being interconnected to an electric circuit, an amplifier for alternating current connected with its input side in a second circuit with said electrodes for being fed therefrom said potentials, frequency selection means associated with said amplifier and arranged to be tuned to a frequency proportional to said first named frequency, means connected at least with relation to the output side of said amplifier for receiving amplified alternating current potentials of selected frequency and operable thereby, and means interconnected in said first named circuit and disposed near said receiving means, said interconnected means including means for rectifying said potentials synchronously with said magnetic field.

HENRY P. KALMUS.
GEORGE O. STRIKER.

REFERENCES CITED

The following references are of record in the file of this patent:

UNITED STATES PATENTS

| Number | Name | Date |
|---|---|---|
| 749,792 | Hewitt | Jan. 19, 1904 |
| 991,304 | Hewitt | May 2, 1911 |
| 1,118,173 | Arnold | Nov. 24, 1914 |
| 1,658,843 | Gray | Feb. 14, 1928 |
| 2,064,469 | Haeff | Dec. 15, 1936 |
| 2,424,933 | Kalmus | July 29, 1947 |